US012269289B2

(12) United States Patent
Fabian et al.

(10) Patent No.: US 12,269,289 B2
(45) Date of Patent: Apr. 8, 2025

(54) SECURITY FEATURE FOR A VALUE DOCUMENT, VALUE DOCUMENT AND METHOD OF PRODUCING A SECURITY FEATURE

(71) Applicant: GIESECKE+DEVRIENT EPAYMENTS GMBH, Munich (DE)

(72) Inventors: Cristina Fabian, Garching (DE); Klaus Kohl, Miesbach (DE); Gunter Endres, Passau (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/556,852

(22) PCT Filed: Apr. 26, 2022

(86) PCT No.: PCT/EP2022/025181

§ 371 (c)(1),
(2) Date: Oct. 23, 2023

(87) PCT Pub. No.: WO2022/228729

PCT Pub. Date: Nov. 3, 2022

(65) Prior Publication Data

US 2024/0217260 A1 Jul. 4, 2024

(30) Foreign Application Priority Data

Apr. 27, 2021 (DE) ..................... 10 2021 002 214.9

(51) Int. Cl.
*B42D 25/41* (2014.01)
*B42D 25/23* (2014.01)
(Continued)

(52) U.S. Cl.
CPC ............. *B42D 25/41* (2014.10); *B42D 25/23* (2014.10); *B42D 25/309* (2014.10); *B42D 25/351* (2014.10)

(58) Field of Classification Search
CPC ....... B42D 25/351; B42D 25/41; B42D 25/23
(Continued)

(56) References Cited

U.S. PATENT DOCUMENTS 10,800,201 B2 10/2020 Zernicek et al.
11,766,885 B2 9/2023 Riedl et al.
(Continued)

FOREIGN PATENT DOCUMENTS

DE 102012204341 A1 9/2013
DE 102016203609 A1 9/2017
(Continued)

OTHER PUBLICATIONS

German Search Report from corresponding DE Application No. 102021002214.9, Oct. 21, 2021.
(Continued)

*Primary Examiner* — Justin V Lewis
(74) *Attorney, Agent, or Firm* — Workman Nydegger

(57) ABSTRACT

A security feature for a value document, into which markings are introduced by at least one laser beam, includes at least one laser-sensitive recording layer which is transparent in the visible spectral range, light-diffracting or light-refracting structures arranged on a first side of the recording layer, at least one first marking which is introduced into the at least one recording layer by a laser beam from at least one direction through the light-diffracting or light-refracting structures into the at least one recording layer and is visible when viewed from the same direction from a second side, at least one second marking which is introduced into the at least one recording layer with a laser beam from the second side of the recording layer and is visible when viewed from the first and the second side.

11 Claims, 3 Drawing Sheets

(51) Int. Cl.
*B42D 25/309* (2014.01)
*B42D 25/351* (2014.01)

(58) Field of Classification Search
USPC ...... 283/67, 70, 72, 74, 87, 91, 94, 98, 109, 283/110, 901
See application file for complete search history.

(56) References Cited

U.S. PATENT DOCUMENTS

| | | | | |
|---|---|---|---|---|
| 2019/0283482 | A1* | 9/2019 | Zernicek | B42D 25/41 |
| 2022/0041004 | A1 | 2/2022 | Riedl et al. | |
| 2022/0134792 | A1 | 5/2022 | Kohl et al. | |

FOREIGN PATENT DOCUMENTS

| | | | |
|---|---|---|---|
| DE | 102016012625 | A1 | 4/2018 |
| DE | 102018007207 | B4 | 10/2020 |
| WO | 2018093251 | A1 | 5/2018 |
| WO | 2020156759 | A1 | 8/2020 |

OTHER PUBLICATIONS

International Search Report from corresponding PCT Application No. PCT/EP2022/025181, Nov. 29, 2022.

* cited by examiner

SECURITY FEATURE FOR A VALUE DOCUMENT, VALUE DOCUMENT AND METHOD OF PRODUCING A SECURITY FEATURE

BACKGROUND

The invention relates to a security feature for a value document, a value document, and a method for producing a security feature.

Value documents or data carriers such as, for example, passport and identification documents, identity cards, credit cards, bank cards and the like are used to an increasing extent in public areas, but also within companies.

It has been known for a long time to provide such value documents or even banknotes with lens grids, for example in the form of lenticular lenses. Such structures provide the value documents with visually variable effects such as tilting images, which at the same time are to provide protection against reproduction.

Such structures offer a slight protection of images against falsification or image manipulation by morphing. It is not possible to check two images merging into one another with 100% certainty.

SUMMARY

It is therefore an object of the present invention to better protect these security features against image manipulations by morphing.

A security feature according to the invention for a value document into which identifiers are introduced by at least one laser beam comprises

- at least one laser-sensitive recording layer that is transparent in the visible spectral range,
- light-diffracting or light-refracting structures arranged on a first side of the recording layer,
- at least one first identifier, which is introduced into the at least one recording layer by means of a laser beam from at least one direction through the light-diffracting or light-refracting structures and can be recognized when viewed from the same direction and from a second side,
- at least one second identifier which is introduced with a laser beam from a second side of the recording layer into the at least one recording layer and can be recognized when viewed from the first and second sides.

A basic concept of the present invention consists in that the security feature comprises a combination of a first identifier which is introduced through light-diffracting or light-refracting structures and is therefore dependent on the viewing angle, and a second identifier independent of the viewing angle.

The changes in the optical properties of the recording layer or the security feature can be visible in transmitted light and/or in incident light. Furthermore, the identifiers can exist in a rasterized form, wherein the raster elements can be formed by, for example, rod-shaped pixels. The at least one identifier also comprises multiple identifiers such as, for example, individual numbers or letters, but also biometric features such as a portrait or a fingerprint.

The security feature proposed here therefore has the advantage that simplified identification and/or checking of the authenticity of the security feature is made possible. Checking is simplified since the so-called dynamic image, or image tilting away under the lens, can very easily be overlapped with the static image introduced from below and checked for correspondence of the features relevant to recognition. This even allows a check with a conventional card reader.

It can be provided that an additional laser-sensitive recording layer that is transparent in the visible spectral range is provided, wherein the at least one first identifier is introduced into the one recording layer, and the at least one second identification is introduced into the additional recording layer. A separation of the two identifiers can be achieved thereby. In addition, different layers or dopings can be used, and different effects can accordingly be realized.

Furthermore, it can be provided that a luminescent substance is introduced between the first identifier and the second identifier. This allows the security feature to be highlighted. In particular, the photoluminescence in the form of fluorescence or phosphorescence is viewed here. For example, when white fluorescence is used, an effect can be achieved while viewing under a UV light as if a light is switched on, or a light beam is focused on the security feature. In this way, easier and clearer recognition and identifiability can be achieved, as well as increased counterfeit protection.

It can be provided that the at least one first identifier is a dynamic representation, and the at least one second identifier is a static representation. The static image or representation is introduced from the side facing away from the lens, and the dynamic image or representation is introduced from the lens side. The static image can be a main image.

It can furthermore be provided that one of the two identifiers is a positive representation, and the other of the two identifiers is a negative of this representation. The dynamic image can be a negative of the static main image or vice versa. A combination with CLIP ID, as disclosed for example in DE 102018007207 B4, is also possible.

It can be provided that one of the two identifiers is a biometric representation, and the other of the two identifiers is a contour of this biometric representation. The dynamic image can be the contour or outline of the main image which can be a photo, for example, or vice versa. A combination with CLIP ID is also possible.

It can further be provided that the identifiers comprise personal data such as a signature, a date of birth, a portrait or the like. In principle, all graphically displayable elements can be represented by individual pixels which are activated by laser irradiation.

It can be provided that the identifiers comprise data relating to the value document such as a period of validity, a card number, information on the issuing authority or the like. In principle, all graphically displayable elements can be represented by individual pixels which are activated by laser irradiation.

It can furthermore be provided that the light-diffracting or light-refracting structures comprise a surface relief in the form of a lens grid. By means of a lens grid with a number or a plurality of individual lenses such as, for example, ball lenses, rod lenses and/or cylindrical lenses, a good visual representation and smooth movement between the identifiers can be achieved.

A value document according to the invention such as a bank note, identification card or the like, comprises a substrate with an opening in which a data carrier as described above is at least partially arranged as a security element.

The data carrier can be arranged completely in the opening. The opening with the data carrier located therein can be covered, for example, by one or more films. Otherwise, the same advantages and modifications as described above apply.

A method according to the invention for producing a security feature comprises the steps of:

- providing at least one laser-sensitive recording layer, which is transparent in the visible spectral range, with light-diffracting or light-refracting structures on a first side of the recording layer,
- introducing at least one first identifier with a laser beam from at least one direction through the light-diffracting or light-refracting structures into the at least one recording layer so that the first identifier can be recognized from the same direction and from a second side when the security feature is subsequently viewed, and
- introducing at least one second identifier with a laser beam from a second side of the recording layer into the at least one recording layer so that the second identification can be recognized when the security feature is subsequently viewed from the first and the second side.

The same advantages and modifications as described above apply.

BRIEF DESCRIPTION OF THE DRAWINGS

The present invention is described by way of example below with reference to the accompanying drawings. In the drawings.

DETAILED DESCRIPTION OF VARIOUS EMBODIMENTS

Figure 1:
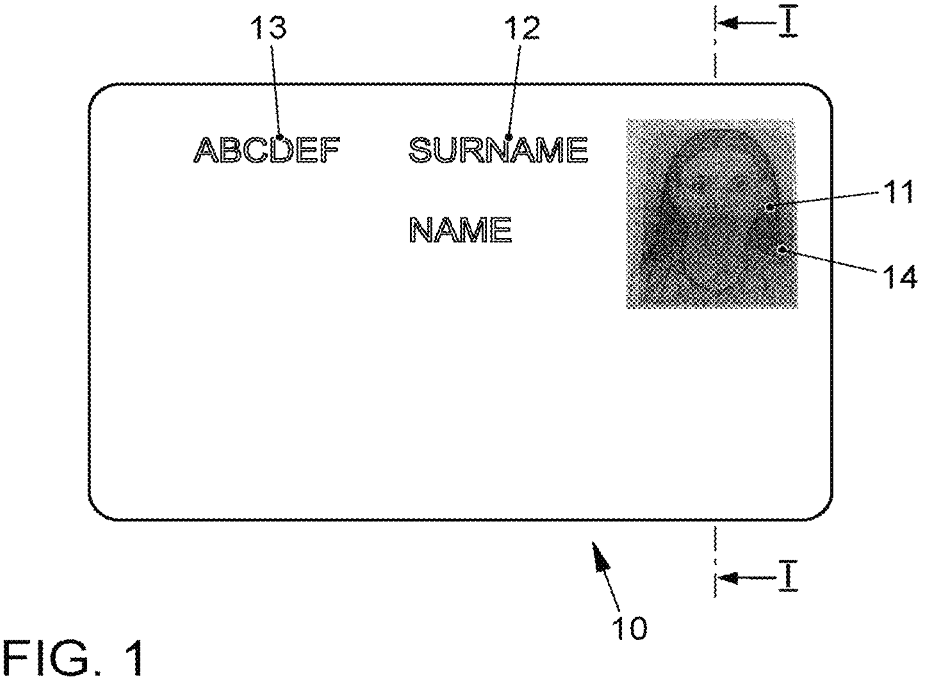
FIG. 1: shows a plan view of a value document.

FIG. 1 is a plan view of a value document 10 in a schematic view. The value document 10 can be a bank note, a passport and identification document, or the like. In the example shown in FIG. 1, the value document 10 is an identification document.

The value document 10 contains a security feature 11 in the form of a portrait of the card holder as well as further personal data 12 such as, for example, the first and last names of the owner. In addition, the identification card may contain further data 13 such as date of birth, nationality, issuing authority, date of issue and the like. The security feature 11 is arranged at least partially in an opening 10*a* of the value document 10.

A tilting image 14 is arranged in the security feature 11 in the form of a portrait of the value document 10 and contains two different pieces of information inscribed in each case by means of a laser beam in the form of a first identifier and a second identifier. In this example, the two identifiers are part of the security feature 11, or the two identifiers form the security feature 11.

Unlike in the graphic representation in FIG. 1, the two identifiers are not simultaneously discernible when the value document 10 is viewed, but only by tilting the value document 10 at a different tilt angle.

Figure 2:
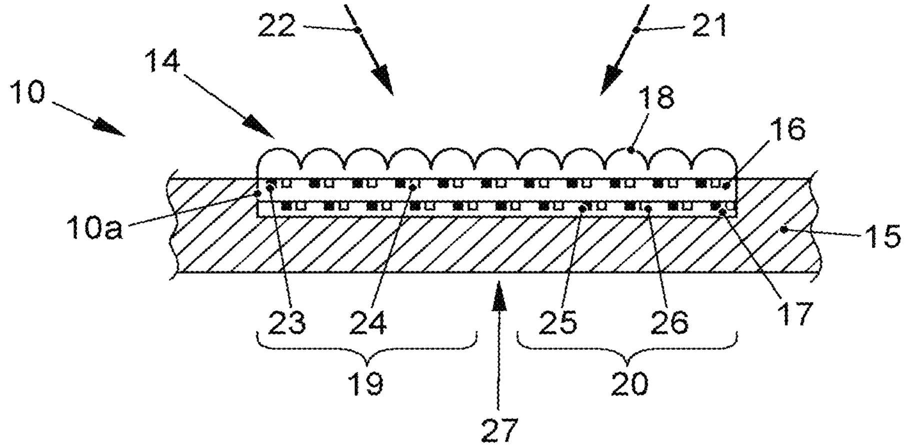
FIG. 2: shows a sectional view of the value document from FIG. 1 according to the line I-I.

The basic design of the tilt image 14 will now explained in more detail with reference to FIG. 2 which shows a section through the value document 10 along the line II-II of FIG. 1.

The value document 10 contains a transparent card body 15 and at least one, preferably two laser-sensitive recording layers 16 and 17. The card body 15 can be transparent or partially transparent. Likewise, the card body 15 can be opaque, in which case a transparent or partially transparent window is provided in the region of the two laser-sensitive recording layers 16 and 17.

The recording layers 16 and 17 are transparent or partially transparent in the visible spectral range like the substrate or card body 15. The recording layers 16 and 17 can be a subsection of the card body 15 or separate layers.

Here, the value document 10 comprises a surface relief in the form of a lens grid 18 on an upper side or front side. The lens grid 18 is arranged above the recording layer 16 and can be arranged directly on the recording layer 16. Accordingly, the recording layer 16 is located between the lens grid 18 and the recording layer 17. Likewise, the surface relief can be arranged in the form of the lens grid 18 on an underside or rear side of the recording layers 16 and 17. The lens grid 18 is then located inside the card body 15.

In this example, a lens grid 18 with individual lenses such as, for example, ball lenses, rod lenses and/or cylinder lenses is used. Instead of the lenses, light-diffracting and/or light-refracting structures can also be used.

A first identifier 19 is introduced into the recording layer 16 which can be referred to as the first recording layer. A second identifier 20 is introduced into the recording layer 17 which can be referred to as the second recording layer. The two recording layers 16 and 17 run parallel to a main surface of the value document 10 and can directly adjoin one another.

The identifiers 19 and 20 introduced into the tilt image 14 contain personal information here and are only inscribed into the recording layers 16 and 17 after the application of the lens grid 18, for example by means of a pulsed infrared laser. This holds true at least for the first identifier 19 in the recording layer 16.

For this purpose, the laser beam is directed from different directions 21 or 22 onto the lens grid 18. The individual lenses of the lens grid 18 focus the laser beam on different small subsections 23 or 24 of the recording layer 16 depending on the irradiation direction.

The effect of the laser radiation locally changes the visual properties of the recording layer 16, for example the layer is blackened locally. When the value document 10 is subsequently viewed from the direction 21, the blackened subsections 23, which combine to form an image for the observer, are discernible due to the focusing effect of the individual lenses. Accordingly, the subsections 24 inscribed from this direction are discernible from the viewing direction 22 and combine to form an image for the observer.

The value document 10 can comprise additional layers, for example one or more protective layers or functional layers provided with other security elements. The transparency of the value document 10 is to be maintained in the region of the inscribed identifiers 19, 20.

The recording layer 17 is described similarly to the recording layer 16. Analogously to the recording layer 16, the recording layer 17 also comprises multiple small subsections 25 and 26. The different subsections 25 and 26 are arranged in a matrix-shaped arrangement in the recording layer 17.

The second identifier 20 is likewise inscribed in the recording layer 17 by means of a laser such as, for example, a pulsed infrared laser. In this case, the information is introduced by the laser beam from an underside into the recording layer 17. The underside is the side of the value document 10 which is opposite the lens grid 18. In this way, the second identifier 20 is introduced into the recording layer 17 undistorted.

Accordingly, if a viewer views the value document 10 from the front side, s/he sees the viewing-angle-dependent first identifier 19 of the recording layer 16 and the viewing-angle-independent second identifier 20 of the recording layer 17. While, as described, the first identifier 19 is visible from the two directions 21 and 22 selectively with respect to the viewing angle, the second identifier 20 is visible from all directions, including the two directions 21 and 22. Accordingly, a tamper-proof tilting image 14 can be generated which has additional information underneath. In this example, the two recording layers 16 and 17 are designed as two recording layers. It is also possible to provide a single recording layer into which the first identifier 19 is inscribed through the lens grid 18 and the second identifier 20 is inscribed from the rear side.

This allows the combination of a static image with a dynamic image or representation. The static image corresponds to the second identifier 20, and the dynamic image corresponds to the first identifier 19. The checking of this security feature is simplified since the dynamic image tilting away under the lens can overlap very easily with the static image. Accordingly, checking for correspondence of recognition-relevant features is simple and can be performed with an automated card reader.

A luminescent substance can be introduced between the first identifier 19 and the second identifier 20. In luminescence, the substance is brought into an excited state by externally supplied energy and emits light as it transitions to its basic state while emitting photons. In particular, the photoluminescence in the form of fluorescence or phosphorescence is viewed here. The luminescent substance can be integrated either by printing or by means of a film or an insert, preferably as white fluorescence. The luminescent material allows easy recognition of the information, for example, for border officials or police officers during a passport check, or a driver's license control by means of a UV lamp.

If only one identifier 19 or 20 is provided, the luminescent substance can be arranged under or above the identifier.

FIG. 3 show a basic representation of a security feature 11 with a positive and contoured front side and a negative rear side.

Figure 3A:
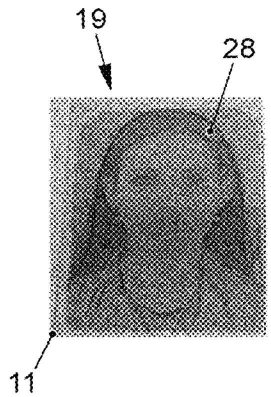
FIG. 3*a*, 3*b*, 3*c*: show a basic representation of a security feature with a positive and contoured front side and a negative rear side.

FIG. 3*a* shows the security features 11 with its front side, that is to say the first identifier 19. The first identifier 19 here comprises a positive representation 28. The positive representation 28 consists of a plurality of picture elements or pixels which are introduced by means of a laser beam as described above. Since the first identifier 19 was introduced through the lens grid, the first identifier 19 is dependent on the viewing angle.

Figure 3B:
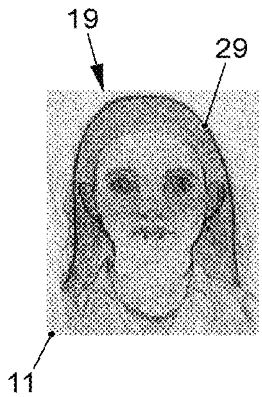

FIG. 3*b* also shows a representation of the first identifier 19 with a contour 29 which surrounds the positive representation 28 from FIG. 3*a*. For example, the positive representation 28 of the first identifier 19 shown in FIG. 3*a* can be shown from the viewing angle or the direction 21. Accordingly, the representation in FIG. 3*b* can be shown from the viewing angle or the direction 22. Accordingly, depending on the viewing angle or direction 21 or 22, the positive representation 28 or the contour 29 is emphasized.

Figure 3C:
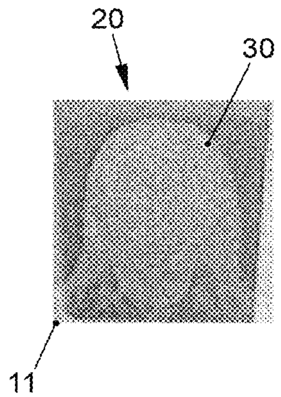

FIG. 3*c* shows a view of the rear side of the security feature 11 or the second identifier 20. The second identifier 20 here comprises a negative representation 30 of the positive representation 28 from FIG. 3*a*. Since the negative representation 30 of the second identifier 20 has not been applied through the lens grid, the second identifier 20 is a static representation. The first identifier 19, more precisely the positive representation 28 and the contour 29. are contrastingly dependent on the viewing angle. Accordingly, in this example of FIGS. 3, the security feature 11 is formed by the first identifier 19 with a positive representation 28 and a contour 29 and the second identifier 20 with a negative representation 30.

Figure 4A:
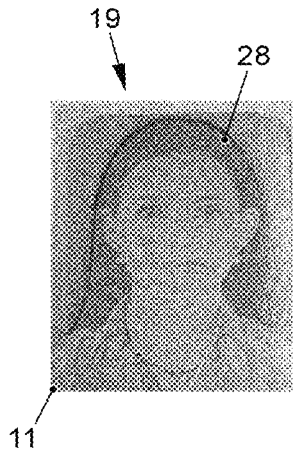
FIG. 4*a*, 4*b*: show a basic representation of a security feature having a positive front side and a negative rear side.
Figure 4B:
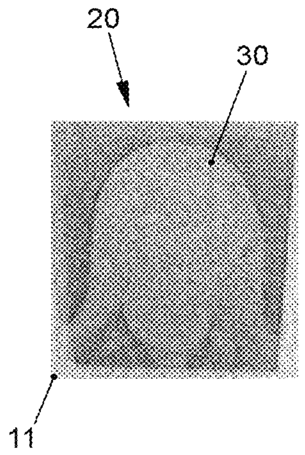

FIG. 4 show a basic representation of a security feature 11 with a positive front side and a negative rear side. FIG. 4*a* shows a first identifier 19 with a positive representation 28. FIG. 4*b* shows the second identifier 20 with a negative representation 30. The negative representation 30 corresponds to the negative of the positive representation 28 from FIG. 4 *a*. Again, the first identifier 19 shown in FIG. 4*a* is dependent on the viewing angle, while the second information 20 shown in FIG. 4*b* is independent of the viewing angle. Correspondingly, the first information 19 can only be recognized from a specific viewing angle, for example the direction 21. In contrast, the second information 20 can be recognized from all viewing angles or directions.

All combinations of the positive representation 28, contour 29 and negative representation 30 in the first identifier 19 and second identifier 20 are possible. A combination with a color separation as a CLIP ID is also possible.

In the above examples, the identifiers 19 and 20 are shown as portrait representations or as parts thereof. One or both identifiers 19, 20 can comprise any personal data such as, for example, a signature, a date of birth or the like. Furthermore, the identifiers 19 or 20 can comprise data relating to the value document 10, such as a validity period, a card number, information on the issuing authority or the like.

Figure 5:
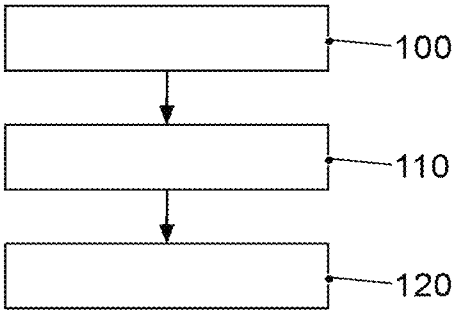
FIG. 5: shows a method for producing a security feature for a value document.

FIG. 5 shows a method for producing a security feature 11 for a value document 10.

In a first step 100, at least one laser-sensitive recording layer 16, 17, which is transparent in the visible spectral range, is provided with a surface relief in the form of a lens grid 18 on a first side of the recording layer 16.

In a second step 110, at least one first identifier 19 is introduced by a laser jet from at least one direction 21, 22 through the lens grid 18 into the recording layer 16 so that the first identifier 19 can be seen from the same direction 21, 22 during subsequent viewing of the security feature 11.

In a third step 120, at least one second identifier 20 is introduced with a laser beam from a second side of the recording layer 17 into the recording layer 17 so that the second identifier 20 can be recognized from all directions during subsequent viewing of the security feature 11.

The sequence of the steps is not necessarily limited to this sequence. Accordingly for example, the second identifier 20 can also be introduced as the first or second step.

The invention claimed is:

1. A security feature, into which identifiers are introduced by at least one laser beam, for a value document, the security feature comprising:

at least one laser-sensitive recording layer in a visible spectral range, light-diffracting or light-refracting structures arranged on a first side of the recording layer, at least one first identifier which is introduced into the at least one recording layer by means of a laser beam from at least one direction through the light-diffracting or light-refracting structures and can be recognized from a same direction and from a second side of the recording layer, at least one second identifier which is introduced by a laser beam from the second side of the recording layer into the at least one recording layer and can be recognized when viewed from the first and second sides of the recording layer;

wherein a luminescent substance is introduced between the first identifier and the second identifier.

2. The security feature according to claim 1, wherein an additional laser-sensitive recording layer that is transparent in the visible spectral range is provided, wherein the at least one first identifier is introduced into the recording layer and the at least one second identifier is introduced into the additional recording layer.

3. The security feature according to claim 1, wherein the at least one first identifier is a dynamic representation, and the at least one second identifier is a static representation.

4. The security feature according to claim 1, wherein one of the two identifiers is a positive of a representation, and the other of the two identifiers is a negative of this representation.

5. The security feature according to claim 1, wherein one of the two identifiers is a biometric representation, and the other of the two identifiers is a contour of this biometric representation.

6. The security feature according to claim 1, wherein the identifiers comprise personal data such as including at least one of a signature, a date of birth, and a portrait.

7. The security feature according to claim 1, wherein the identifiers comprise data relating to the value document such as including at least one of a validity period, a card number, and information on an issuing authority.

8. The security feature according to claim 1, wherein the light-diffracting or light-refracting structures comprise a surface relief in the form of a lens grid.

9. A value document, selected from at least one of a bank note, passport and identification documents, with a substrate having an opening in which the security feature according to claim 1 is at least partially arranged.

10. A security feature, into which identifiers are introduced by at least one laser beam, for a value document, the security feature comprising:

at least one laser-sensitive recording layer in a visible spectral range, light-diffracting or light-refracting structures arranged on a first side of the recording layer, at least one first identifier which is introduced into the at least one recording layer by means of a laser beam from at least one direction through the light-diffracting or light-refracting structures and can be recognized from a same direction and from a second side of the recording layer, at least one second identifier which is introduced by a laser beam from the second side of the recording layer into the at least one recording layer and can be recognized when viewed from the first and second sides of the recording layer;

wherein one of the two identifiers is a positive of a representation, and the other of the two identifiers is a negative of this representation.

11. A security feature, into which identifiers are introduced by at least one laser beam, for a value document, the security feature comprising:

at least one laser-sensitive recording layer in a visible spectral range, light-diffracting or light-refracting structures arranged on a first side of the recording layer, at least one first identifier which is introduced into the at least one recording layer by means of a laser beam from at least one direction through the light-diffracting or light-refracting structures and can be recognized from a same direction and from a second side of the recording layer, at least one second identifier which is introduced by a laser beam from the second side of the recording layer into the at least one recording layer and can be recognized when viewed from the first and second sides of the recording layer;

wherein one of the two identifiers is a biometric representation, and the other of the two identifiers is a contour of this biometric representation.

* * * * *